United States Patent
Bathwal et al.

(10) Patent No.: US 9,961,581 B2
(45) Date of Patent: May 1, 2018

(54) STATUS PROHIBITION TIMER DISABLING FOR PARTIAL STATUS REPORT

(71) Applicant: QUALCOMM Incorporated, San Diego, CA (US)

(72) Inventors: Saket Bathwal, Hyderabad (IN); Gang Andy Xiao, San Diego, CA (US); Shailesh Maheshwari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 14/861,911

(22) Filed: Sep. 22, 2015

(65) Prior Publication Data

US 2016/0127939 A1    May 5, 2016

(30) Foreign Application Priority Data

Oct. 31, 2014   (IN) .......................... 3451/MUM/2014

(51) Int. Cl.
| | |
|---|---|
| *H04W 24/10* | (2009.01) |
| *H04W 72/14* | (2009.01) |
| *H04L 5/00* | (2006.01) |
| *H04L 1/18* | (2006.01) |
| *H04W 88/02* | (2009.01) |

(52) U.S. Cl.
CPC .......... *H04W 24/10* (2013.01); *H04L 1/1854* (2013.01); *H04L 5/0055* (2013.01); *H04W 72/14* (2013.01); *H04W 88/02* (2013.01)

(58) Field of Classification Search
None
See application file for complete search history.

(56) References Cited

U.S. PATENT DOCUMENTS

| | | | |
|---|---|---|---|
| 7,321,589 | B2 | 1/2008 | Lohr et al. |
| 2003/0191844 | A1 | 10/2003 | Meyer et al. |
| 2004/0148546 | A1 | 7/2004 | Meyer et al. |
| 2007/0064602 | A1* | 3/2007 | Jiang ...................... H04L 1/187 370/229 |

(Continued)

FOREIGN PATENT DOCUMENTS

WO    WO-2009/132276 A2    10/2009

OTHER PUBLICATIONS

International Search Report and Written Opinion—PCT/US2015/051698—ISA/EPO—Dec. 18, 2015. (13 pages).

*Primary Examiner* — Hicham Foud
(74) *Attorney, Agent, or Firm* — Arent Fox, LLP

(57) ABSTRACT

Apparatus and methods, in one or more aspects, provide for status report management of received data packets at a wireless device. The wireless device may determine that a first status report, generated in response to identifying a number of missing data packets within a sequence of a plurality of data packets received at the UE, includes information associated with fewer than the number of missing data packets. The wireless device may transmit the first status report. The wireless device may also disable a status prohibition timer in response to the transmitting based on the determination. The wireless device may transmit a second status report including information associated with a remainder of the number of missing data packets not included in the first status report.

15 Claims, 11 Drawing Sheets

(56) References Cited

U.S. PATENT DOCUMENTS

| | | | |
|---|---|---|---|
| 2009/0232069 A1* | 9/2009 | Sun | H04L 1/1628 370/329 |
| 2009/0268683 A1 | 10/2009 | Ho et al. | |
| 2010/0105334 A1* | 4/2010 | Terry | H04L 1/1607 455/67.11 |
| 2011/0310997 A1 | 12/2011 | Ke et al. | |
| 2012/0020310 A1* | 1/2012 | Ji | H04W 48/16 370/329 |
| 2013/0235768 A1 | 9/2013 | Earnshaw et al. | |
| 2013/0310092 A1* | 11/2013 | Tabet | H04L 1/0003 455/501 |
| 2014/0082447 A1 | 3/2014 | Kanamarlapudi et al. | |
| 2015/0092708 A1* | 4/2015 | Su | H04W 76/026 370/329 |
| 2015/0237621 A1* | 8/2015 | Zhu | H04W 72/0426 370/329 |

\* cited by examiner

STATUS PROHIBITION TIMER DISABLING FOR PARTIAL STATUS REPORT

CLAIM OF PRIORITY

The present Application for Patent claims priority to Indian Application Number 3451/MUM/2014, entitled "STATUS PROHIBIT TIMER DISABLING FOR PARTIAL STATUS REPORT" filed Oct. 31, 2014, and assigned to the assignee hereof and hereby expressly incorporated by reference herein.

BACKGROUND

The described aspects relate generally to wireless communication systems. More particularly, the described aspects relate to techniques for radio link status reporting.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems. These multiple access technologies have been adopted in various telecommunication standards to provide a common protocol that enables different wireless devices to communicate on a municipal, national, regional, and even global level.

An example telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

In wireless communication systems employing LTE, a user equipment (UE) served by one or more eNodeBs may occasionally tune away a radio receiver from one frequency, radio access technology (RAT), and/or air interface related to a different subscriber identity module (SIM) in order to monitor another frequency, another RAT, and/or another air interface associated with a second SIM. During a tune away, reception performance of the UE on the initial frequency may be reduced, resulting in an increased number of missed or incorrectly received data packets. If the UE is unable to retransmit and recover the missed or incorrectly received data packets at lower protocol layers, e.g., through retransmission requests, then higher layer protocols, such as transmission control protocol (TCP), may experience higher round trip times, resulting in a disproportionate decrease in throughput.

Therefore, there is a desire for improvements in techniques for reporting the status of missing data packets at lower protocol layers of the UE, especially when a relatively large number of data packets are affected by an event such as a tune away.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Apparatus and methods, in one or more aspect, provide for status report management of received data packets at a wireless device. The wireless device may determine that a first status report, generated in response to identifying a number of missing data packets within a sequence of a plurality of data packets received at the UE, includes information associated with fewer than the number of missing data packets. The wireless device may transmit the first status report. The wireless device may also disable a status prohibition timer in response to the transmitting based on the determination. The wireless device may transmit a second status report including information associated with missing data packets that were not associated with the first status report. The second status report may be transmitted prior to a time equal to the transmission time of the first status report plus a time of the status prohibition timer. The number of missing data packets may be missed during a tune away by the wireless device.

In an aspect, the disclosure provides a method of wireless communications. The method may include determining, by a user equipment (UE), that a first status report, generated in response to a number of missing data packets, includes information associated with fewer than the number of missing data packets. The method may further include transmitting the first status report. The method may also include disabling a status prohibition timer based on the determination.

In another aspect, the disclosure provides a UE for wireless communications with respect to reporting a receipt status of a data packet. The UE may include a transceiver configured to wirelessly transmit and receive data packets including a first status report. The UE may further include a memory configured to store a record of data packets received by the transceiver. The UE may further include a processor communicatively coupled to the transceiver and the memory. The processor may be configured to determine that the first status report, generated in response to identifying a number of missing data packets within a sequence of a plurality of data packets received at the UE, includes information associated with fewer than the number of missing data packets. The processor may also be configured to initiate transmission of the first status report via the transceiver. The processor may additionally be configured to disable a status prohibition timer in response to the transmitting based on the determination.

Another aspect of the disclosure provides another (UE) for wireless communications with respect to reporting a receipt status of a data packet. The UE may include means for determining, at the UE, that a first status report, generated in response to identifying a number of missing data packets within a sequence of a plurality of data packets received at the UE, includes information associated with fewer than all of the number of missing data packets. The UE may further include means for transmitting the first status report. The UE may also include means for prohibiting initiation of disabling a status prohibition timer in response to transmitting the first status report based on the determination.

In another aspect, the disclosure provides a computer-readable medium storing computer executable code for wireless communications with respect to reporting a receipt status of a data packet. The computer-readable medium may be a non-transitory computer-readable medium. The computer-readable medium may include code for determining, by a UE, that a first status report, generated in response to identifying a number of missing data packets within a sequence of a plurality of data packets received at the UE, includes information associated with fewer than the number of missing data packets; code for transmitting the first status report; and code for disabling a status prohibition timer in response to the transmitting based on the determination.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
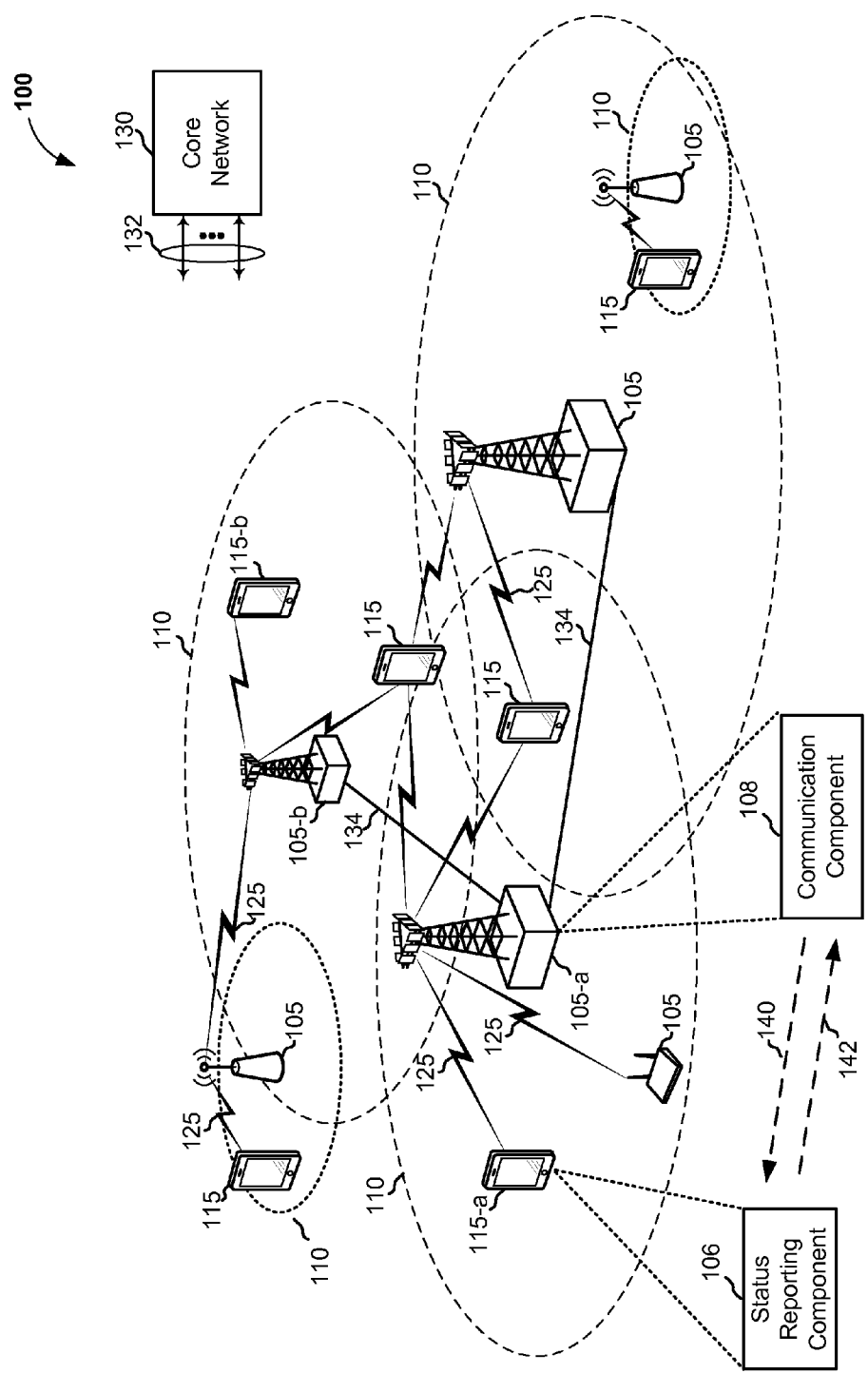
FIG. 1 is a block diagram illustrating a wireless communication system in which status reporting management may be implemented in accordance with the present aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. Moreover, the term "component" as used herein may be one of the parts that make up a system, may be hardware or software or some combination thereof, and may be divided into other components.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The present disclosure presents various aspects for managing status reporting for a radio link between a UE and an eNodeB. When a UE performs a tune-away from the eNodeB to monitor other radio networks, the UE may remain in a connected mode with the eNodeB, but the reception performance of the UE may be degraded. For example, the UE may lose the use of one or more receive chains for receiving and processing signals transmitted by the eNodeB. Accordingly, the UE may be unable to correctly receive and decode data packets transmitted by the eNodeB. The UE may also be unable to correctly receive and decode data packets for other reasons such as interference, movement, blocking objects, a high downlink block error rate, or a number of CRC failures.

A radio link control (RLC) protocol may be used to recover missing data packets. The RLC protocol may assign each data packet (e.g., protocol data unit (PDU)) a sequence number (SN). As used herein, the term "PDU" refers to an RLC layer PDU. A PDU may be an example of a data packet. When triggered, an RLC entity (e.g., a hardware and/or software entity that operates at an RLC protocol layer of a UE) may send a status report to a corresponding RLC entity (e.g., a hardware and/or software entity that operates at an RLC protocol layer of an eNodeB) either acknowledging (ACK) or negatively-acknowledging (NACK) whether each PDU in a sequence of PDUs, each having a respective SN, has been received. In an aspect, the status report may include the SN of the most recently received data packet followed by the SN of each data packet that is NACK, e.g., not received and/or not correctly decodable.

When a large number of data packets have not been correctly received and an uplink grant is limited, the UE may be unable to transmit a full list of NACK data packets in a single status report because the UE uplink grant may not provide enough resources to send the entire list, e.g., because the size of the status report including the full list of NACK data packets would exceed the size of the grant. A status report that does not include a status for each of a number of missing data packets may be referred to as a "partial status report." After sending a partial status report including a partial list of NACK data packets, the UE may be configured to wait for a status prohibition timer to expire before transmitting a next status report indicating a remaining number (or a portion of the remaining number that can fit within the grant) of the NACK data packets. The delay in transmitting the next (and any subsequent) status report may significantly increase a round trip time for any data included in the NACK data packets. For example, the delay induced by the status prohibition timer may be longer than the tune away period during which the data packets were first transmitted. Accordingly, the round trip time for the data packets may include both the tune away period and the status prohibition timer duration.

In another aspect, a partial status report may include only the SN of the last received data packet because there is no room to indicate NACK data packets. The eNodeB may be unsure of which data packets to retransmit when receiving a partial status report with no NACK data packets indicated. For example, the eNodeB may retransmit the last transmitted data packet even though a different data packet is missing. As such, in a case where the UE does not receive the missing packet(s) in the retransmission, the UE may send another partial status report with the same information, leading to a deadlock situation and possible radio link failure.

According to the present aspects, the UE may selectively disable a configured status prohibition timer in order to allow for quicker receipt (as compared to existing solutions) of retransmission(s) of any missed data packets in a sequence of received data packets. For example, when a first status report is generated in response to a number of missing packets in a sequence of a plurality of data packets received at UE, but the first status report includes information (e.g., SN(s)) associated with fewer than all of the number of missing packets, the UE may disable the status prohibition timer. The UE may then transmit a second status report including information (e.g., SN(s)) associated with a remainder of the number of missing data packets not included in the first status report. The second status report may be transmitted prior to a time equal to the transmission time of the first status report plus a time of the status prohibition timer (e.g., prior to a time when the status prohibition timer would have expired if not disabled). Although this example (and other examples herein) refers to a first status report and a second status report, it should be understood that the present aspects apply to any number of status reports needed to report all of a number of missing packets in a sequence of a plurality of data packets received at the UE.

Therefore, the present aspects may be especially useful when the UE operates in communication with the eNodeB and experiences a relatively large number of missing data packets (e.g., a number of packets greater than a maximum packet size in octets), as the presently described status report management allows disabling of a status prohibition timer such that a all of the number of missing data packets may be reported without the delay caused by a status prohibit timer. The eNodeB may retransmit the missing data packets quickly, relative to current solutions, allowing the UE to maintain throughput at higher protocol layers.

Referring first to FIG. 1, a diagram illustrates an example of a wireless communications system 100, in accordance with an aspect of the present disclosure. The wireless communications system 100 includes a plurality of access points (e.g., base stations, eNBs, or WLAN access points) 105, also referred to herein as network nodes, a number of user equipment (UEs) 115, and a core network 130. Access points 105 may include a communication component 108 configured to communicate one or more signals 140 including resource grants and/or UE data to UEs, including UE 115-a. Correspondingly, one or more of UEs, such as UE 115-a, may include a status reporting component 106 configured to generate a first status report, determine whether the first status report is a partial status report, disable a status prohibition timer and transmit the first status report and a second status report using one or more signals 142 to access point 105 to indicate whether data packets of the one or more signals 140 were properly received and/or decoded.

In an aspect, for example, status reporting component 106 may be configured to generate a first status report signal 142 including information (e.g., a respective SN) associated with fewer than all of a number of missing data packets in a sequence of a plurality of data packets received at UE 115-a. The missing packets may include any packet or PDU in the sequence of the plurality of data packets received at UE 115-*a* that was not received or not correctly received. For example, the information included in first status report signal 142 associated with each missing packet may include, but is not limited to, an identification of one or more missing packets, such as one or more values representing one or more sequence numbers (SN) corresponding to one or more missing packets. For instance, UE 115-*a* may determine a data packet in a sequence of a plurality of data packets received at UE 115-*a* to be missing if one or more data packets having an SN value less than an SN value of a most recently received data packet are missing from the sequence. In other words, in one example, UE 115-*a* may determine that the respective data packet with the missing SN was not received. In another example, UE 115-*a* may determine a missing packet to be a received packet where a cyclic redundancy check (CRC) or other decoding validation fails. As such, in an aspect, a missing packet may include any packet for which an RLC protocol provides a negative-acknowledgment (NACK). For example, the first status report signal 142 may include a list identifying NACK data packets within the sequence of the plurality of data packets received at UE 115-*a*. The number of NACK data packets identified in the list of NACK data packets in the first status report signal 142 may be limited by the size of an uplink grant and/or a configured RLC PDU size. Accordingly, the list of NACK data packets in the first status report signal 142 may not include all of the missing data packets within the sequence of the plurality of data packets received at UE 115-*a*. Further, for example, the status reporting component 106 may be configured to determine that the first status report includes fewer than all of the number of missing data packets. Additionally, the status reporting component 106 may be configured to transmit the first status report within the sequence of the plurality of data packets received at UE 115-*a*. For example, the status reporting component 106 may send the first status report to a lower layer (e.g., PHY layer) for transmission as a radio signal (e.g., via a transceiver and antenna). Correspondingly, the status reporting component 106 may also be configured to disable a status prohibition timer in response to the determination that the transmitted first status report is a partial status report including information associated with fewer than the total number of missing data packets within the sequence of the plurality of data packets received at UE 115-*a*. As such, status reporting component 106 may transmit a second status report signal 142 (and, other subsequent status report signals, as necessary) including information associated with a remaining portion of the missing data packets within the sequence of the plurality of data packets received at UE 115-*a*.

Access points 105 may communicate control information and/or UE data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communications link 125 may be a multi-carrier signal modulated according to the various radio technologies described above. Each modulated signal may be sent on a different carrier and may carry control information (e.g., reference signals, control channels, etc.), overhead information, data, etc.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via a backhaul link 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communications links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

Each of the different operating modes that may be employed by wireless communications system 100 may operate according to frequency division duplexing (FDD) or time division duplexing (TDD). In some examples, OFDMA communications signals may be used in the communications links 125 for LTE downlink transmissions, while single carrier frequency division multiple access (SC-FDMA) communications signals may be used in the communications links 125 for LTE uplink transmissions. Additional details regarding implementation of status reporting in a system such as the wireless communications system 100, as well as other features and functions related to communications in such systems, are provided below with reference to the following figures.

Figure 2:
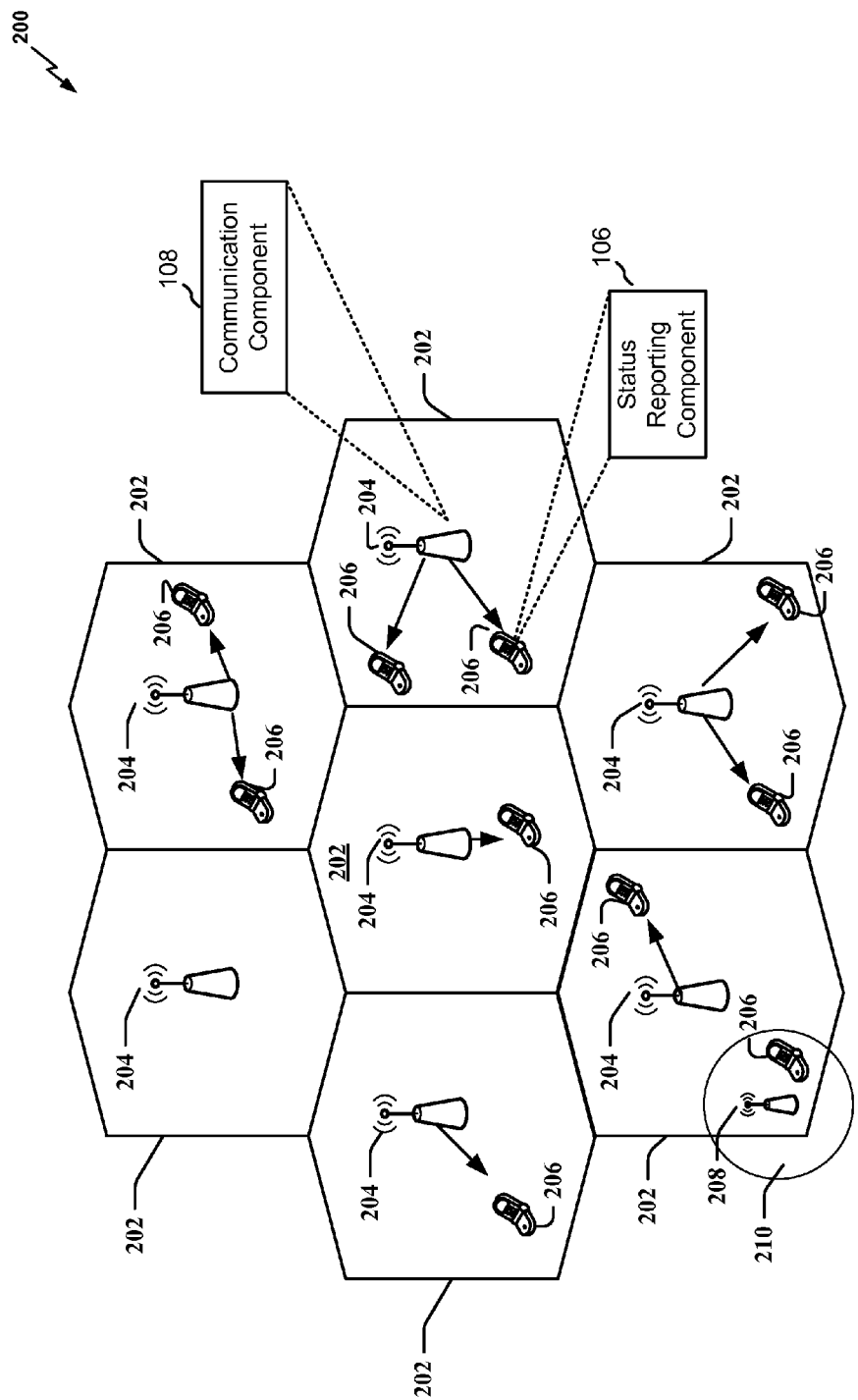
FIG. 2 is a diagram illustrating an example of an access network in which status reporting management may be implemented in accordance with the present aspects.

FIG. 2 is a diagram illustrating an example of an access network 200 in an LTE network architecture, in which one or more UEs 206 may include status reporting component 106 to provide status reports to one or more eNBs 208 in response to communication component 108 transmitting one or more resource grants and/or UE data, as described herein. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to a core network for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to a serving gateway.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate, or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
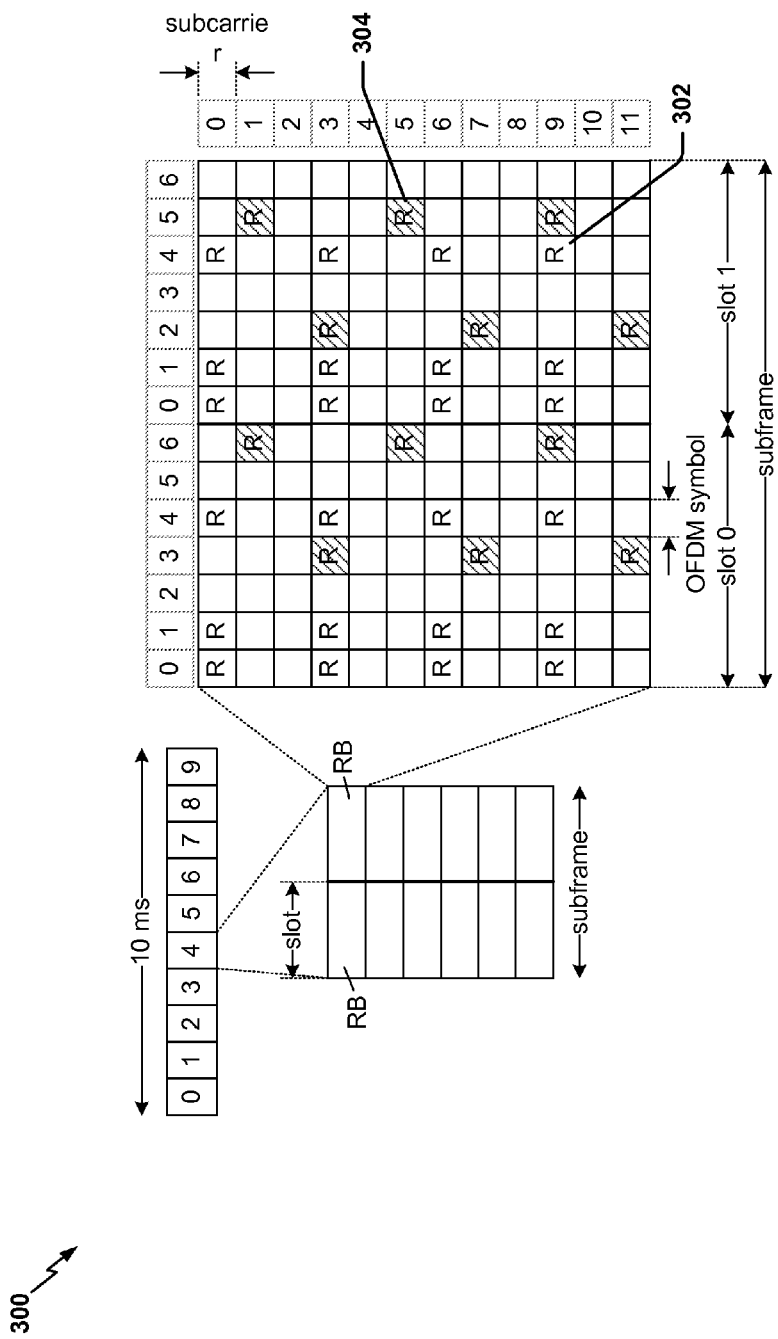
FIG. 3 is a diagram illustrating an example of a DL frame structure in LTE that may be used in conjunction with the present aspects.

FIG. 3 is a diagram 300 illustrating an example of a DL frame structure in LTE, which, in some examples, may be utilized by UEs and network nodes in the present disclosure for receiving downlink data packets and downlink grants. A frame (10 ms) may be divided into 10 equally sized subframes. Each sub-frame may include two consecutive time slots. A resource grid may be used to represent two time slots, each time slot including a resource element block. The resource grid is divided into multiple resource elements. In LTE, a resource element block may contain 12 consecutive subcarriers in the frequency domain and, for a normal cyclic prefix in each OFDM symbol, 7 consecutive OFDM symbols in the time domain, or 84 resource elements. For an extended cyclic prefix, a resource element block may contain 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource element blocks upon which the corresponding physical downlink shared channel (PDSCH) is mapped. The number of bits carried by each resource element depends on the modulation scheme. Thus, the more resource element blocks that a UE receives and the higher the modulation scheme, the higher the downlink data rate for the UE. Likewise, the RLC layer PDU size and number of data packets carried in a sub-frame may vary based on the number of bits carried by each resource element and the number of resource element blocks that the UE receives. Accordingly, the status reporting component 106 may need to acknowledge a larger number of data packets when the data rate for the UE is higher.

Figure 4:
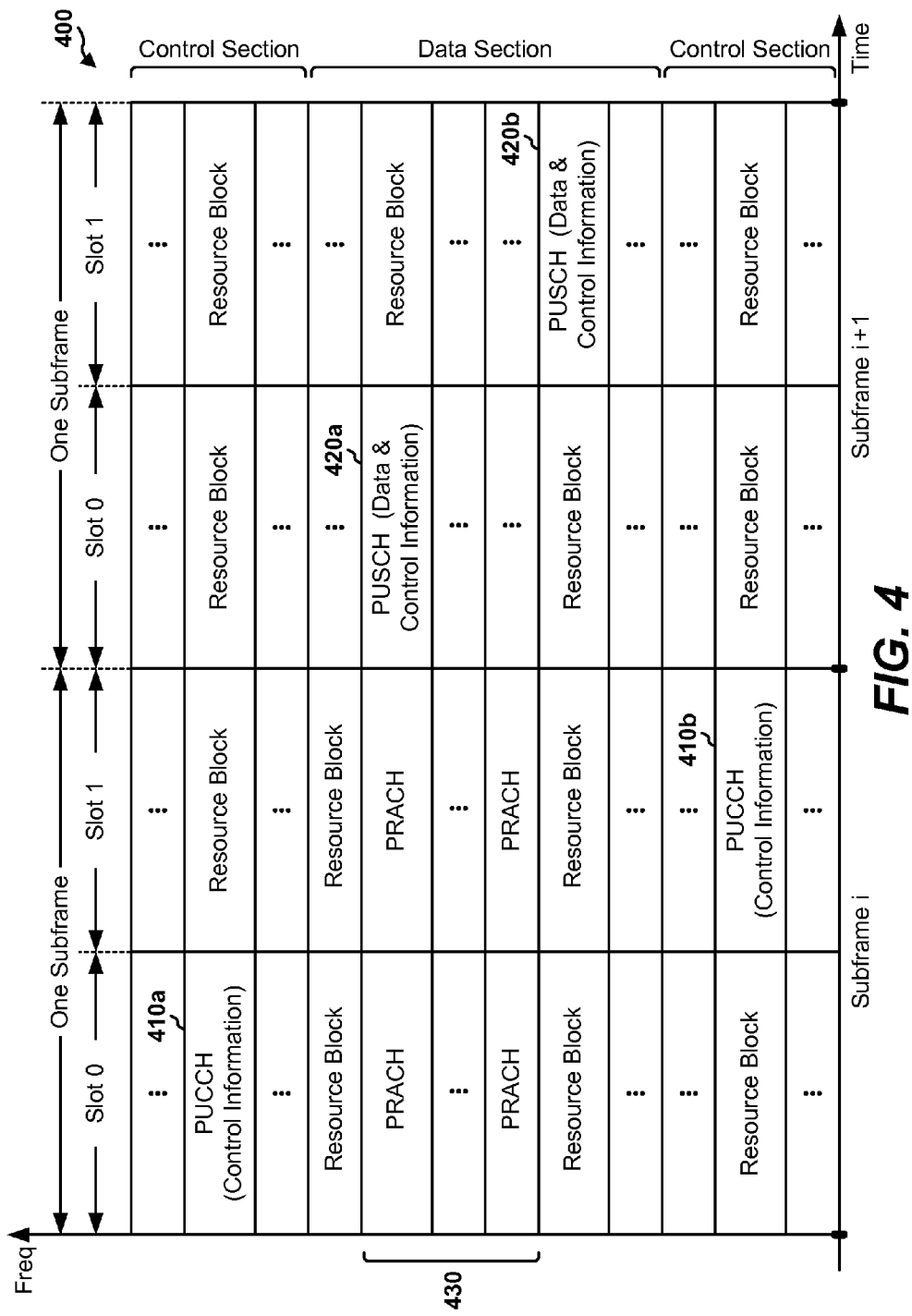
FIG. 4 is a diagram illustrating an example of an UL frame structure in LTE that may be used in conjunction with the present aspects.

FIG. 4 is a diagram 400 illustrating an example of an UL frame structure in LTE which, in some examples, may be utilized for transmitting a status report. The available resource element blocks for the UL may be partitioned into a data section and a control section. The control section may be formed at the two edges of the system bandwidth and may have a configurable size. The resource element blocks in the control section may be assigned to UEs for transmission of control information. The data section may include all resource element blocks not included in the control section. The UL frame structure results in the data section including contiguous subcarriers, which may allow a single UE to be assigned all of the contiguous subcarriers in the data section.

A UE may be assigned resource element blocks 410a, 410b in the control section to transmit control information to an eNB. The UE may also be assigned resource element blocks 420a, 420b in the data section to transmit data to the eNB. The UE may transmit control information in a physical UL control channel (PUCCH) on the assigned resource element blocks in the control section. The UE may transmit only data or both data and control information in a physical UL shared channel (PUSCH) on the assigned resource element blocks in the data section. In an aspect, the status reporting component 106 may transmit a status report at the RLC layer as data on the PUSCH. The size of a status report may be based on the assigned resource element blocks in the data section. For example, a grant may indicate the assigned resource element blocks as well as a modulation and coding scheme to be used for uplink transmissions. The status reporting component 106 may determine a maximum packet size for the status report based on the grant. A UL transmission may span both slots of a sub-frame and may hop across frequency.

A set of resource element blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource element blocks. The starting frequency is specified by the network. That is, the transmission of the random access preamble is restricted to certain time and frequency resources. There is no frequency hopping for the PRACH. The PRACH attempt is carried in a single sub-frame (1 ms) or in a sequence of few contiguous subframes and a UE can make only a single PRACH attempt per frame (10 ms).

Figure 5:
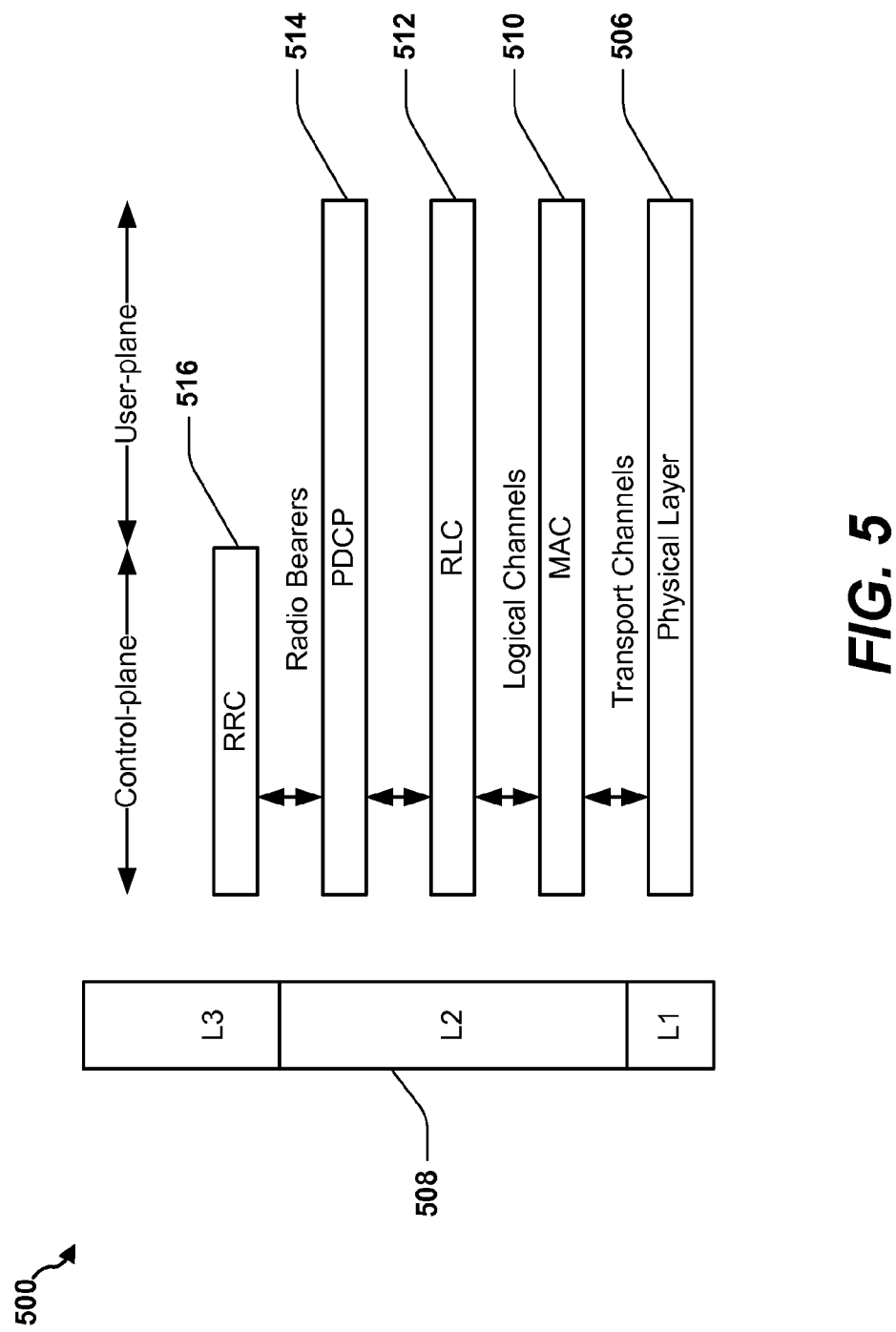
FIG. 5 is a diagram illustrating an example of a radio protocol architecture for the user and control planes that may be used in conjunction with the present aspects.

FIG. 5 is a diagram 500 illustrating an example of a radio protocol architecture for the user and control planes in LTE by which status reporting management may be implemented, as described herein. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated on the network side, a transport layer (e.g. TCP Layer) and an application layer that are terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). For example, the RLC sublayer 512 provides status reports from the UE to the eNB to identify missing data packets. In an aspect, the status reporting component 106 may be implemented at the RLC sublayer 512. The MAC sublayer 510 provides multiplexing between logical and transport channels. The MAC sublayer 510 is also responsible for allocating the various radio resources (e.g., resource element blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
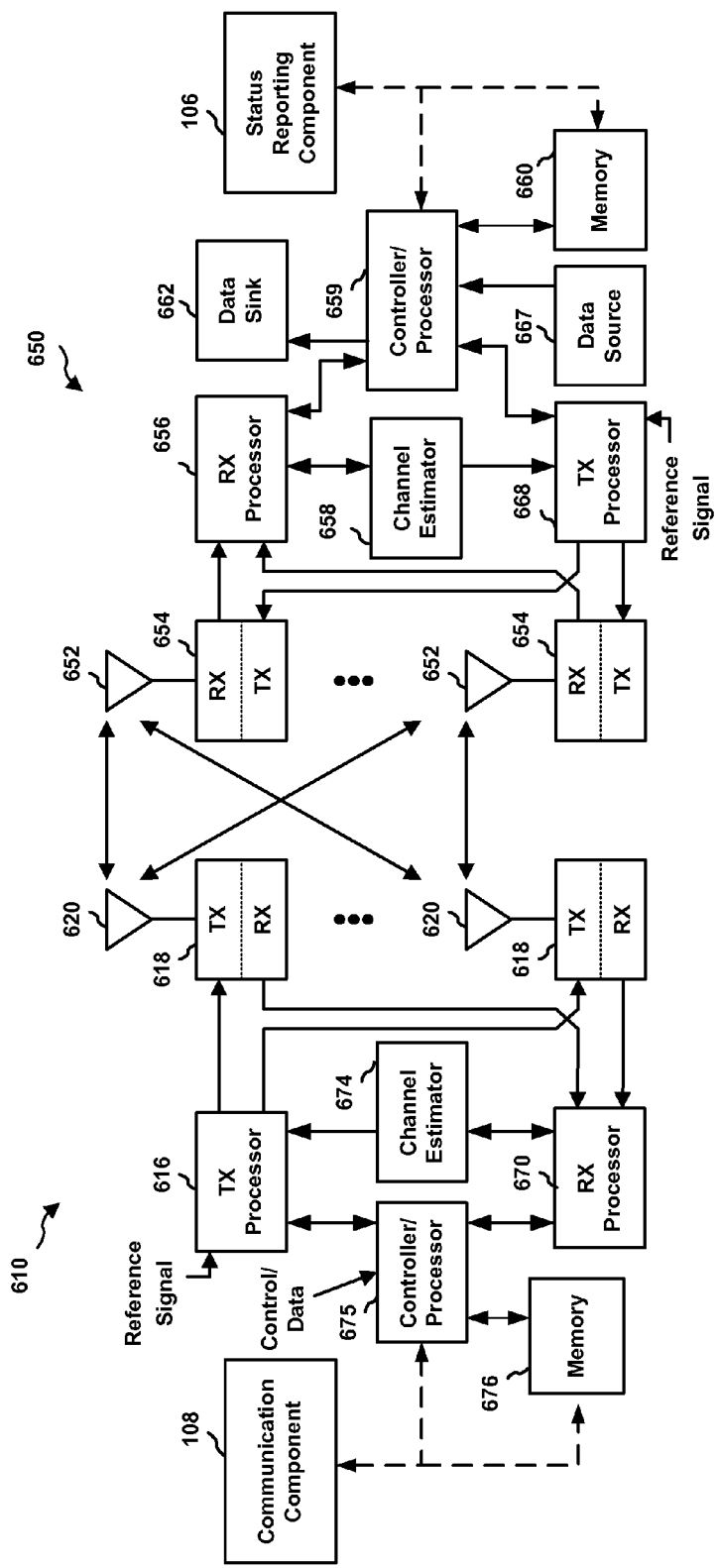
FIG. 6 is a diagram illustrating an example of an evolved Node B and user equipment in an access network in which status reporting management may be implemented in accordance with the present aspects.

FIG. 6 is a block diagram of an eNB 610 in communication with a UE 650 in an access network in which UE 650 may include status reporting component 106 to provide status reports to eNB 610 in response to communication component 108 transmitting one or more resource grants and/or UE data, as described herein. In the DL, upper layer packets from the core network are provided to a controller/processor 675. The controller/processor 675 implements the functionality of the L2 layer (e.g., RLC protocol). In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (e.g., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network.

The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations. The controller/processor 659 is also responsible for radio link control using status reports to indicate ACK and/or NACK of data packets at an RLC sub-layer. It should be noted that the RLC ACK/NACK may be separate from the HARQ ACK/NACK operations. The RLC sub-layer may receive data packets when the HARQ process successfully receives a packet and sends an ACK for the HARQ process. The RLC sub-layer may reorder the received data packets to determine whether any data packets are missing (e.g., because the HARQ process carrying the data packet was NACK or because the HARQ process reached a retransmission limit). The RLC ACK/NACK may be based on a moving window for SNs that allows the HARQ process to recover a data packet before the RLC layer reports the data packet as NACK.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controller/processor 675 is also responsible for radio link control using status reports to indicate ACK and/or NACK of data packets at an RLC sub-layer. As discussed above, the RLC sub-layer ACK/NACK protocol may operate above the HARQ ACK/NACK operations.

Figure 7:
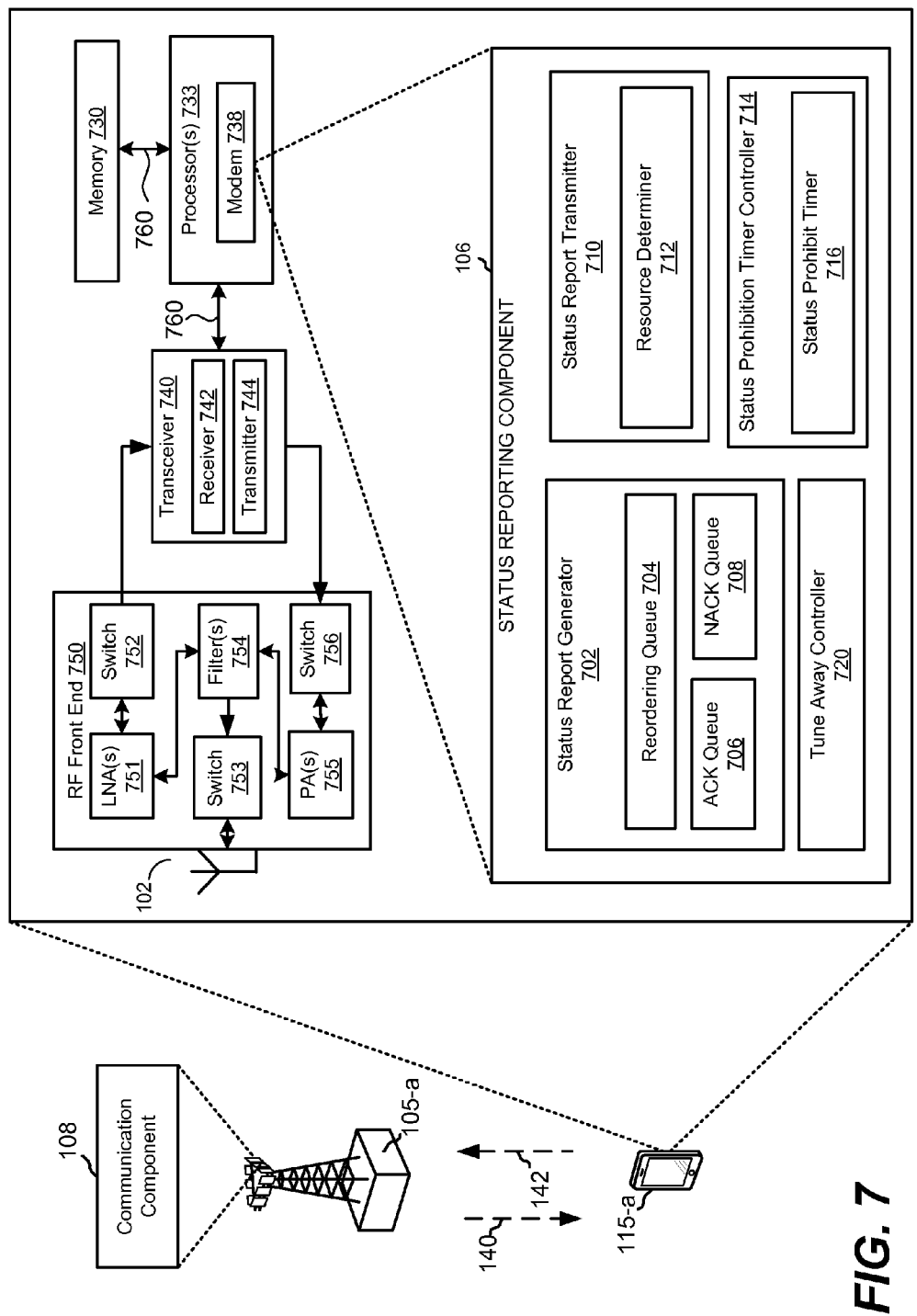
FIG. 7 is a diagram illustrating one or more components by which status reporting management may be implemented in accordance with the present aspects.

Referring to FIG. 7, one or more components of UE 115-*a* of FIG. 1, by which status reporting management may be implemented, are illustrated with respect to status reporting component 106. It should be noted that each of the one or more components of UE 115-*a* may be implemented as a software, hardware, firmware, or any combination thereof. As noted above, UE 115-*a* generally operates status reporting component 106 to provide one or more status reports indicating whether data packets transmitted by the eNB were correctly received.

According to the present aspects, the UE 12 may include one or more processors 733 that may operate in combination with the status reporting component 106 configured to provide one or more status reports indicating whether data packets transmitted by the eNodeB were correctly received. For example, the status reporting component 106 may transmit a partial first status report and a second status report. The status reporting component 106 may be communicatively coupled to a transceiver 740, which may include a receiver 742 for receiving and processing RF signals and a transmitter 744 for processing and transmitting RF signals. The status reporting component 106 may include a status report generator 702 for determining whether a first status report, generated in response to a number of missing data packets, includes information associated with fewer than the number of missing data packets, status report transmitter 710 for transmitting the first status report; and a status prohibition timer controller 714 for disabling a status prohibition timer. The processor 733 may be coupled to the transceiver 740 and a memory 730 via at least one bus 760.

The receiver 742 may include hardware, firmware, and/or software code executable by a processor for receiving data, the code comprising instructions and being stored in a memory (e.g., computer-readable medium). The receiver 742 may be, for example, a radio frequency (RF) receiver. In an aspect, the receiver 742 may receive and decode signals transmitted by the access point 105-*a*. If the receiver 742 is unable to successfully decode data packet carried by the signals (e.g., CRC failure), the data packet may be considered a missing data packet.

The transmitter 744 may include hardware, firmware, and/or software code executable by a processor for transmitting data, the code comprising instructions and being stored in a memory (e.g., computer-readable medium). The transmitter 744 may be, for example, a RF transmitter. The transmitter 744 may transmit a status report to the access point 105-*a*. For example, in an LTE system, the transmitter 744 may transmit the status report as data on a physical uplink shared channel (PUSCH).

In an aspect, the one or more processors 733 can include a modem 738 that uses one or more modem processors. The various functions related to status reporting component 106 may be included in modem 738 and/or processors 733 and, in an aspect, can be executed by a single processor, while in other aspects, different ones of the functions may be executed by a combination of two or more different processors. For example, in an aspect, the one or more processors 733 may include any one or any combination of a modem processor, or a baseband processor, or a digital signal processor, or a transmit processor, or a transceiver processor associated with transceiver 740. In particular, the one or more processors 733 may implement components included in the status reporting component 106.

For example, UE 115-*a* may execute a status report generator 702 for generating a status report in response to identifying a missing number of data packets. In an aspect, for example, the status report generator 702 may include hardware, firmware, and/or software code executable by a processor 733 for generating a status report in response to identifying a missing number of data packets within a sequence of a plurality of data packets received at the UE, the code comprising instructions and being stored in a memory (e.g., computer-readable medium). The status report generator 702 may maintain a reordering queue 704 for received data packets according to a sequence number. The reordering queue 704 may include, for example, a memory (e.g., RAM) for storing received packets according to SN. The status report generator 702 may track data packets received within a receive window of SNs. The status report generator 702 may generate a status report when triggered by a polling bit within a received data packet.

In an example implementation, the SNs of the reordering queue may include a receive window defined by a receive side modulus base VR(R) and a maximum receive (MR) window size VR (MR). The VR(R) may be a state variable that holds the value of the SN following the last in-sequence completely received data packet. The VR(R) may be considered the lower edge of the receive window. The VR (MR) may be a state variable holding the value of the SN of the first data packet that is beyond the receive window. The VR (MR) may be the higher edge of the receive window. The status report generator 702 may determine that a data packet is missing when the SN received is not VR(R) (e.g., there is a difference between the expected received packet and the actual received packet) For example, when the UE 115-*a* receives a data packet having a SN greater than the VR(R) but less than VR(MR), the status report generator 702 may determine that any SNs with no received data packets between VR(R) and newly received SN are missing. In other words, if the reordering queue 704 does not include a data packet corresponding to an SN within the receive window, the data packet corresponding to the SN may be considered missing.

The status report generator 702 may further include an ACK queue 706 and a NACK queue 708. The ACK queue 706 and NACK queue 708 may each include, for example, a memory (e.g., RAM). The ACK queue 706 may store the SN of successfully received data packets. The NACK queue 708 may store the SN of missing data packets. When triggered to generate a status report, the status report generator may form a data packet including the highest SN of the ACK queue 706 and zero or more SNs of missing data packets in the NACK queue 708. The status report may be limited to the size of a single data packet (e.g., a PDU) as determined by an uplink grant size. Accordingly, the status report generator 702 may not be able to include an SN for all of the missing data packets in a status report when there is a limited uplink grant size. Instead, the status report generator may generate the first status report including information (e.g., SNs) associated with the number of missing data packets up to the maximum data packet size. A status report that does not include an SN for every missing data packet in the NACK queue 708 may be referred to as a partial status report. The status report generator 702 may determine that a status report is a partial status report when a status report includes information associated with fewer missing data packets than all of the number of missing data packets in the NACK queue 708.

Moreover, for example, UE 115-*a* may operate the status report transmitter 710 to transmit one or more status reports as status report signals 142. In an aspect, for example, the status report transmitter 710 may include hardware, firmware, and/or software code executable by a processor 733 for transmitting one or more status reports as uplink signals, the code comprising instructions and being stored in a memory (e.g., computer-readable medium). In an aspect, for example, status report transmitter 710 is in communication with status report generator 702 and receives or otherwise obtains status reports from status report generator 702. The status report transmitter 710 may transmit a first status report that includes fewer than the number of missing data packets and then transmit a second status report including information associated with a remainder of the number of missing data packets not included in the first status report. Thus, status report transmitter 710 may transmit status report signal 142, which includes information associated with the missing data packets and is further defined by a maximum packet size.

Further, in an aspect, for instance, status report transmitter 710 may include a resource determiner 712, which may receive or otherwise obtain information identifying what resource grants were received at UE 115-*a*. In an aspect, for example, the resource determiner 712 may include hardware, firmware, and/or software code executable by a processor 733 for determining a maximum data packet size based on an uplink grant, the code comprising instructions and being stored in a memory (e.g., computer-readable medium). Accordingly, based on the uplink grant, resource determiner 712 may determine resources available to transmit a status report. In an aspect, the resource determiner 712 may allocate a portion of the resources indicated in the uplink grant to a bearer associated with the status report. For example, the resource determiner 712 may be able to allocate the entire uplink grant to the bearer. In another aspect, the resource determiner 712 may split the uplink grant between multiple bearers. The resource determiner 712 may determine a maximum size of a data packet for the status report based on the allocated resource, and provide the maximum packet size to the status report generator 702 to use when generating status reports. In an aspect, the resource determiner 712 may operate at the MAC sublayer 510 (FIG. 5) to determine the maximum packet size.

Additionally, for example, UE 115-*a* may operate a status prohibition timer controller 714 to determine whether to disable a status prohibition timer 716. The status prohibition timer 716 may be associated with the RLC sublayer 512 (FIG. 5) and be configured with a minimum duration of time between consecutive status reports. For example, the status prohibition timer 716 may start when a first status report is transmitted and expire after the minimum duration of time. In an aspect, for instance, status prohibition timer controller 714 may disable the status prohibition timer 716 when status report generator 702 determines that a generated status report is a partial status report. In an aspect, the status prohibition timer controller 714 may disable the status prohibition timer 716 by, for example, preventing initiation of the status prohibition timer 716 upon transmission of a partial status report, configuring the status report generator 702 and/or status report transmitter 710 to ignore the status prohibition timer 716, or causing the status prohibition timer 716 to expire sooner than configured (e.g., immediately). If, on the other hand, a status report is a full status report including information associated with every missing data packet (e.g., the NACK queue 708 is emptied), the status prohibition timer controller 714 may initiate the status prohibition timer 716 in response to status report transmitter 710 transmitting the full status report. Accordingly, based on the determination of status report generator 702 regarding whether the transmitted status report includes information associated with fewer than the number of missing data packets, the status prohibition timer controller 714 may disable the status prohibition timer 716.

Further, UE 115-*a* may operate a tune away controller 720 to tune a receiver away from a communication channel for a tune away period. The communication channel may be, for example, a carrier used for communication with the access points 105-*a*. The tune away controller 720 may tune the receiver to a different air interface technology, a different radio frequency, and/or an air interface related to a second SIM. During the tune away period, the UE 115-*a* may be unable to receive any data packets transmitted on the communication channel from the access point 105-*a*. Accordingly, the status report generator 702 may determine that data packets transmitted during the tune away period are missing packets.

Moreover, in an aspect, UE 115-*a* may include RF front end 750 and transceiver 740 for receiving and transmitting radio transmissions, for example, signals 140 transmitted by the access point 105-*a* and signal 142 transmitted by the UE 115-*a*. For example, transceiver 740 may receive a data packet on a PDSCH transmitted by the access point 105-*a*. UE 115-*a*, upon receipt of an entire message, may decode the packet and perform a cyclic redundancy check (CRC) to determine whether the packet was received correctly. For example, transceiver 740 may communicate with modem 738 to transmit status reports generated by status reporting component 106 and to receive messages and forward them to status reporting component 106.

RF front end 750 may be connected to one or more antennas 770 and can include one or more low-noise amplifiers (LNAs) 751, one or more switches 752, 753, one or more power amplifiers (PAs) 755, and one or more filters 754 for transmitting and receiving RF signals. In an aspect, components of RF front end 750 can connect with transceiver 740. Transceiver 740 may connect to one or more modems 738 and processor 733.

In an aspect, LNA 751 can amplify a received signal at a desired output level. In an aspect, each LNA 751 may have a specified minimum and maximum gain values. In an aspect, RF front end 750 may use one or more switches 752, 753 to select a particular LNA 751 and its specified gain value based on a desired gain value for a particular application.

Further, for example, one or more PA(s) 755 may be used by RF front end 750 to amplify a signal for an RF output at a desired output power level. In an aspect, each PA 755 may have a specified minimum and maximum gain values. In an aspect, RF front end 750 may use one or more switches 753, 756 to select a particular PA 755 and its specified gain value based on a desired gain value for a particular application.

Also, for example, one or more filters 754 can be used by RF front end 750 to filter a received signal to obtain an input RF signal. Similarly, in an aspect, for example, a respective filter 754 can be used to filter an output from a respective PA 755 to produce an output signal for transmission. In an aspect, each filter 754 can be connected to a specific LNA 751 and/or PA 755. In an aspect, RF front end 750 can use one or more switches 752, 753, 756 to select a transmit or receive path using a specified filter 754, LNA, 751, and/or PA 755, based on a configuration as specified by transceiver 740 and/or processor 103.

Transceiver 740 may be configured to transmit and receive wireless signals through antenna 770 via RF front end 750. In an aspect, transceiver may be tuned to operate at specified frequencies such that UE 12 can communicate with, for example, access points 105. In an aspect, for example, modem 738 can configure transceiver 740 to operate at a specified frequency and power level based on the UE configuration of the UE 115-*a* and communication protocol used by modem 738.

In an aspect, modem 738 can be a multiband-multimode modem, which can process digital data and communicate with transceiver 740 such that the digital data is sent and received using transceiver 740. In an aspect, modem 738 can be multiband and be configured to support multiple frequency bands for a specific communications protocol. In an aspect, modem 738 can be multimode and be configured to support multiple operating networks and communications protocols. In an aspect, modem 738 can control one or more components of UE 115-*a* (e.g., RF front end 750, transceiver 740) to enable transmission and/or reception of signals from the network based on a specified modem configuration. In an aspect, the modem configuration can be based on the mode of the modem and the frequency band in use. In another aspect, the modem configuration can be based on UE configuration information associated with UE 115-*a* as provided by the network during cell selection and/or cell reselection.

UE 12 may further include a memory 730, such as for storing data used herein and/or local versions of applications or status reporting component 106 and/or one or more of its subcomponents being executed by processor 733. Memory 730 can include any type of computer-readable medium usable by a computer or processor 733, such as random access memory (RAM), read only memory (ROM), tapes, magnetic discs, optical discs, volatile memory, non-volatile memory, and any combination thereof. In an aspect, for example, memory 730 may be a computer-readable storage medium that stores one or more computer-executable codes defining status reporting component 106 and/or one or more of its subcomponents, and/or data associated therewith, when UE 115-*a* is operating processor 733 to execute status reporting component 106 and/or one or more of its subcomponents. In another aspect, for example, memory 730 may be a non-transitory computer-readable storage medium.

Figure 8:
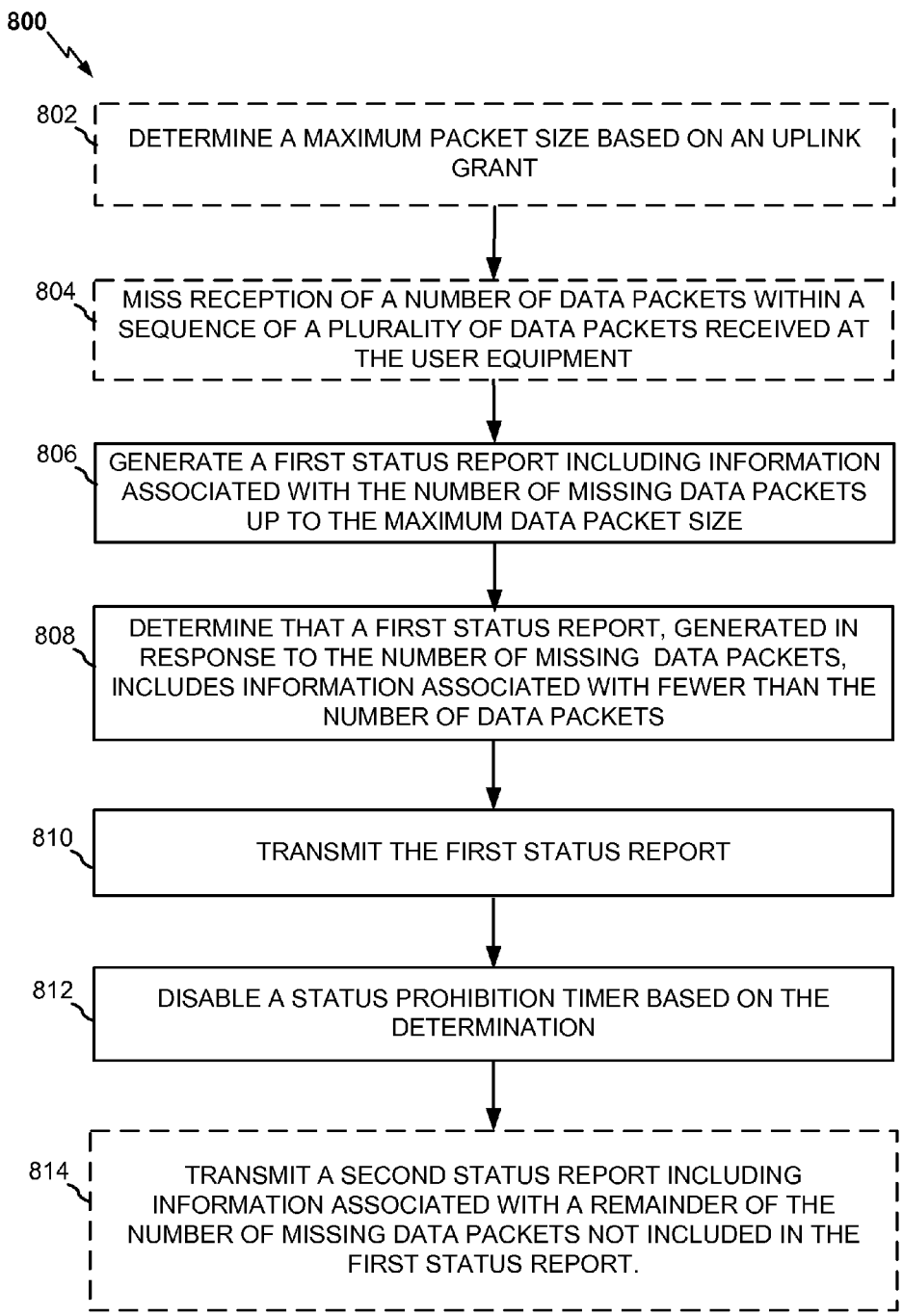
FIG. 8 is a flowchart of an aspect of a method of providing feedback with respect to downlink communications received by a UE in accordance with the present aspects.

Referring to FIG. 8, in an aspect, one non-limiting example of a method 800 of providing status reports with respect to downlink communications received by a UE, especially, for instance, following a tune-away operation. Method 800 may be operated by, for example, UE 115-*a* via execution of status reporting component 106, as described herein. It should be noted that aspects are described with reference to one or more components and one or more methods that may perform the actions or functions described herein. Although the operations described below are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

At block 802, method 800 may optionally include determining a maximum data packet size based on an uplink grant. In an aspect, for example, the resource determiner 712 may determine a maximum data packet size based on an uplink grant. The uplink grant may be received from the access point 105-*a*. The resource determiner 712 may operate at the MAC sub-layer to determine a transport block size for a transmission opportunity. The resource determiner 712 may further divide the transport block size among various bearers to determine the maximum data packet size for each bearer. The resource determiner 712 may provide the maximum data packet size to the status report generator 702 for generating the status report. In an aspect, because the maximum data packet size is limited by the uplink grant and may be divided among multiple bearers, the size of a status report may be limited.

At block 804, method 800 may optionally include missing reception of a number of data packets within a sequence of a plurality of data packets received at the user equipment. In an aspect, for example, the tune away controller 720 may be configured to perform a tune away. During the tune away, one or more antennas and/or receive chains of the UE 115-*a* may be used to monitor another frequency, radio access technology network, or subscription (e.g., associated with a different SIM). For example, the tune away may be associated with a tune away from one air interface technology, frequency, and/or SIM to a different air interface technology, a different radio frequency, or an air interface related to a different, e.g., second, subscriber identification module (SIM) (e.g., associated with the UE that includes first and second SIMs). During the tune away, the UE 115-*a* or a receiver thereof may be unable to receive, or may be more unable to correctly receive, one or more of a sequence of a plurality of data packets that are being transmitted to UE 115-*a*, e.g., by access point 105-*a*, in association with the air interface technology, frequency, and/or SIM from which UE 115-*a* has tuned away. Accordingly, the UE 115-*a* or a receiver thereof may miss reception of a number of data packets during the tune away. In an aspect, during a tune away, uplink transmission properties may not be changed. Accordingly, the UE 115-*a* may maintain a size of the uplink grant, for example, during and after the tune away.

At block 804, the method 800 may include generating a first status report including information associated with the number of missing data packets up to the maximum data packet size. In an aspect, for example, the status report generator 702 may generate the first status report including information associated with the number of missing data packets up to the maximum data packet size.

At block 808, the method 800 may include determining that a first status report, generated in response to identifying a missing number of data packets within a sequence of a plurality of data packets received at the UE, includes information associated with fewer than the number of missing data packets. In an aspect, for example, UE 115-*a* may include status reporting component 106 and/or status report generator 702 configured to determine that a first status report, generated in response to a missing number of data packets within the sequence of the plurality of data packets received at the UE 115-*a*, includes information associated with fewer than the number of missing data packets. For instance, the status reporting component 106 and/or status report generator 702 may determine that the first status report includes negative-acknowledgements (NACKs) for a number of packets less than the number of missing data packets.

At block 810, method 800 may include transmitting the first status report. In an aspect, for example, UE 115-*a* may include status reporting component 106 and/or status report transmitter 710 configured to transmit the first status report. The first status report may be transmitted at a first transmit time. For example, the status reporting component 106 and/or status report transmitter 710 may send a data packet including the first status report to a lower layer for transmission as a status report signal 142.

At block 812, method 800 may include disabling a status prohibition timer in response to transmitting the first status report based on the determination that the first status report includes information associated with fewer than the number of missing data packets. In an aspect, for example, UE 115-a may include status reporting component 106 and/or status prohibition timer controller 714 configured to disable a status prohibition timer 716 in response to the transmitting based on the determination. The status prohibition timer 716 may be configured by the network to start when a status report is transmitted. The status prohibition timer controller 714, however, may disable the status prohibition timer 716 to prevent the timer from starting when the first status report is transmitted. The status prohibition timer controller 714 may also disable the status prohibition timer 716 by resetting, expiring, ignoring, or otherwise causing the status prohibition timer 716 to allow a second status report.

At block 814, method 800 may optionally include transmitting a second status report including information associated with a remainder of the number of missing data packets not included in the first status report. In an aspect, for example, the status reporting component 106 and/or status report transmitter 710 may be further configured to transmit the second status report including information associated with at least a portion of a remainder of the number of missing data packets not included in the first status report. For example, the status reporting component 106 and/or status report transmitter 710 may send a data packet including the second status report to a lower layer for transmission as a status report signal 142. The amount of information transmitted in the second status report may be based on an applicable grant. For example, an increased grant size may allow information associated with a greater number of the missing data packets to be transmitted. In an aspect, if the second status report also includes information associated with fewer than the number of remaining data packets, the status reporting component 106 and/or status report transmitter 710 may transmit a third status report, and so on until information associated with the remaining data packets has been transmitted.

Figure 9:
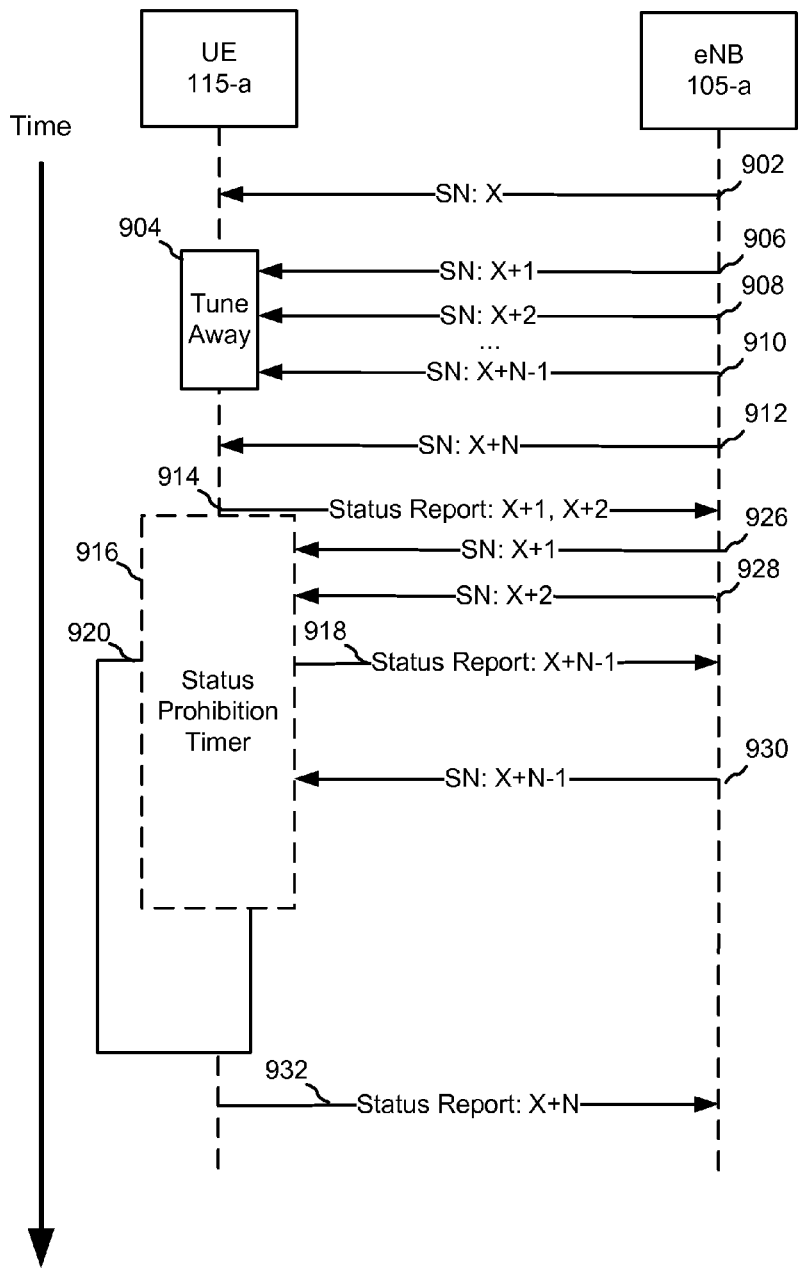
FIG. 9 is a diagram illustrating example data packets transmitted between a UE and an evolved Node B.

Referring to FIG. 9, a message diagram 900 illustrates example data packets that may be transmitted between a UE 115-a and an access point 105-a, which may, for example, be an eNB. For example, the UE 115-a may receive a data packet 902 having a SN of X. The UE 115-a may successfully receive the data packet 902. The UE 115-a may then begin a tune away 904. During the tune away 904, the access point 105-a may transmit data packets 906, 908, and 910 having SNs X+1, X+2, and X+N−1, respectively. The access point 105-a may transmit other data packets (not shown) having SNs between X+2 and X+N−1. Because of the tune away, the UE 115-a may be unable to correctly receive and decode some or all of data packets 906, 908, and 910 (and/or other data packets (not shown) having SNs between X+2 and X+N−1). After the tune away 904, the UE 115-a may receive a data packet 912 having a SN of X+N. After reordering received data packets, the UE 115-a may determine that data packets with SN X+1 through X+N−1, e.g., data packet 906 through data packet 910, are missing. The UE 115-a may then transmit a status report 914 including, for example, information identifying SNs X+1 and X+2 as being not received (e.g., a NACK). The UE 115-a may be unable to include additional information identifying additional missing SNs in status report 914 due to a maximum data packet size imposed by an uplink grant. Accordingly, the status report 914 may not include an SN of a missing data packet such as, for example, SN X+N−1. The UE 115-a may be configured to start a status prohibition timer for a time 916 in response to transmitting the status report 914. In an aspect, the time 916 for the status prohibition timer may be longer than the tune away 904. Accordingly, if initiated, the status prohibition timer may result in a significant delay in the retransmission of a missing data packet such as data packet 910, for which the status report 914 does not include an associated SN. As discussed above, the status prohibition timer controller 714 may disable the status prohibition timer during the time 916 in response to determining that status report 914 has been transmitted but does not include information identifying all of the missing data packets in the sequence of the plurality of data packets received at UE 115-a, e.g., the sequence of SN X+1 to SN X+N−1. Accordingly, the UE 115-a may transmit another, subsequent status report 918 that includes information identifying all (or a portion of) the remaining ones of the missing data packets during the time 916 when the status prohibition timer would typically run. For example, the subsequent status report 918 may be transmitted in the next transmission opportunity available to the UE 115-a following transmission of the status report 914. The UE 115-a may initiate a status prohibition timer for a time 920 following the transmission of the subsequent status report 918. In an aspect, if the subsequent status report 918 is also a partial status report, the UE 115-a may continue to disable the status prohibition timer during the time 920 until information associated with all of the missing data packets is transmitted. In other words, one or more subsequent status reports 918 may be transmitted while the status prohibit timer is disabled, where the number of subsequent status reports 918 depends on the allowable size of each status report (e.g., based on the size of the uplink grant) and the size of the information identifying the remaining ones (after transmission of status report 914 and other subsequent status reports 918, if applicable) of the missing data packets.

The access point 105-a may retransmit data packets in response to the status report 914 and the subsequent status report 918. For example, data packet 926 may be a retransmission of the data packet 906 and include SN X+1. As another example, data packet 928 may be a retransmission of the data packet 908 and include SN X+2. As yet another example, data packet 930 may be a retransmission of the data packet 910 and include SN X+N. The UE 115-a may receive the retransmitted data packets and determine that the received data packets are no longer missing. The UE 115-a may transmit another status report 932 after the time 916 acknowledging that data packets up to SN X+N have been received.

Figure 10:
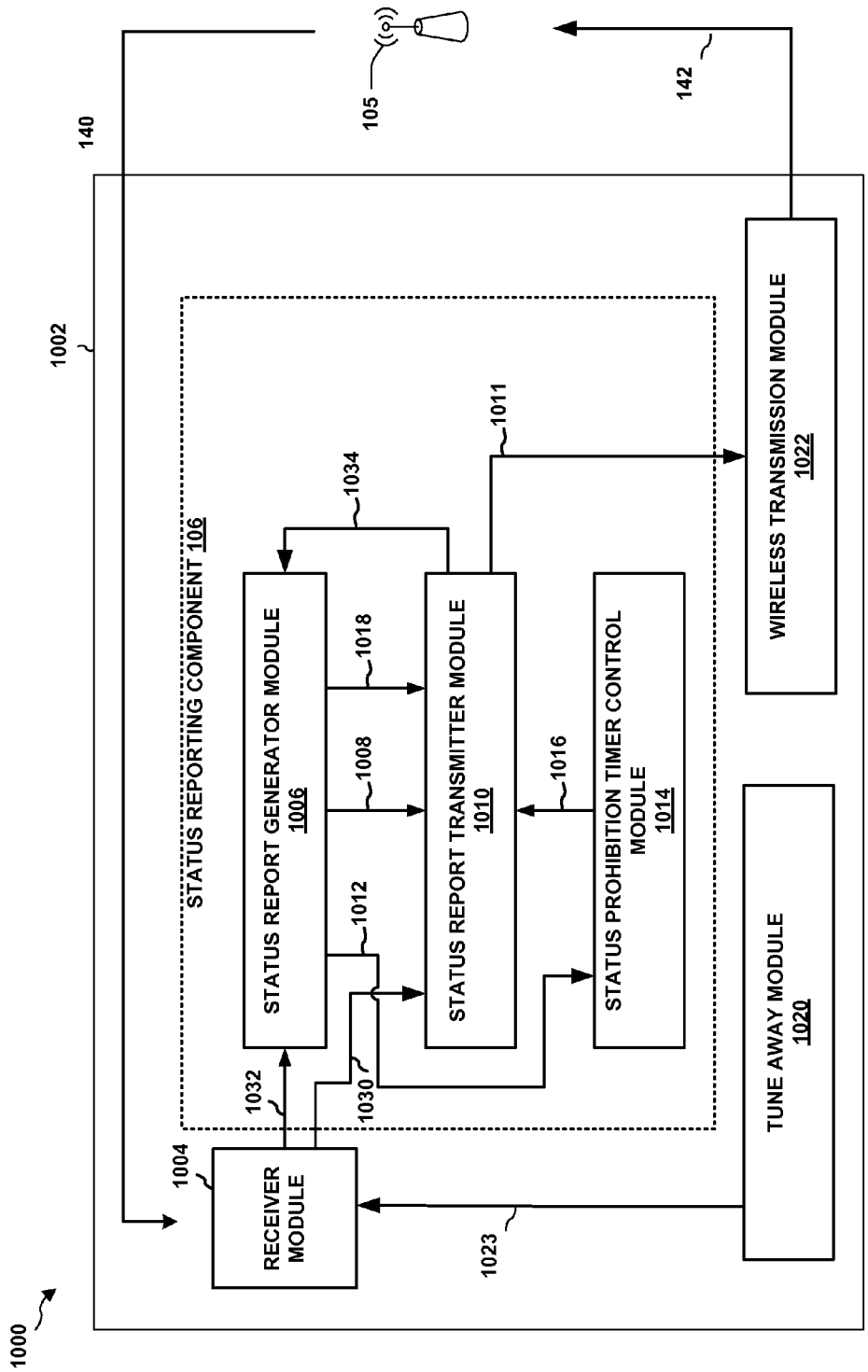
FIG. 10 is a conceptual data flow diagram illustrating the data flow between different modules/means/components in an exemplary apparatus in which status reporting management may be implemented in accordance with the present aspects.

FIG. 10 is a conceptual data flow diagram 1000 illustrating the data flow between different modules/means/components in an exemplary apparatus 1002 that may implement the UE 115-a and/or status reporting component 106 as described herein. The apparatus 1002 includes a receiver module 1004 that is configured to receive signal 140 (e.g., sent to apparatus 1002 by a access point 105), one or more modules that define the functionality of status reporting component 106, and a status report transmitter module 1010 that is configured to transmit status report signal 142, for example.

In an aspect, receiver module 1004 may receive signal 140 having one or more channels and including one or more grants 1030 and downlink data 1032 from access point 105 and respectively output grants 1030 to status report transmitter module 1010 and downlink data 1032 to status report generator module 1006. The status report generator module 1006 may implement the status report generator 702 to generate a status report based on the downlink data 1032. Status report generator module 1006 may then output or otherwise provide an indication of or provide access to the status report 1008 to a status report transmitter module 1010. The status report generator module 1006 may also output or otherwise provide a second status report 1018 to the status report transmitter module 1010. The status report generator module 1006 may also output or otherwise provide an indication of or provide access to a determination 1012 that the status report 1008 includes information associated with a number of data packets less than a number of missing data packets. Status report transmitter module 1010 may implement the status report transmitter 710 including the resource determiner 712, while status prohibition timer control module 1014 may implement the status prohibition timer controller 714.

The status report transmitter module 1010 may receive the status report 1008 and respectively output a status report packet 1011 to the wireless transmission module 1022. The wireless transmission module 1022 may modulate a carrier with the status report packet 1011 for wireless transmission as a status report signal 142 to access point 105. The status report transmitter module 1010 may further determine a maximum data packet size 1034 based on the grants 1030. The status report transmitter module 1010 may provide the maximum data packet size 1034 to the status report generator module 1006 for generating the status report so that the status report fits within the maximum packet size.

The status prohibition timer control module 1014 may output a control signal 1016 based on the determination 1012 to the status report transmitter module 1010. The status report transmitter module 1010 may transmit the status report signal 142 based on the control signal 1016 provided by the status prohibition timer control module 1014. For example, the control signal 1016 may prevent the status report transmitter module 1010 from transmitting a status report until the status prohibition timer control module 1014 determines that a status prohibition times has expired or has been disabled.

The apparatus 1002 may further include a tune away module 1020. The tune away module 1020 may output a control signal 1023 to the receiver module 1004 to perform a tune away. The control signal 1023 may cause the receiver module 1004 to receive signals on a different frequency, signals using a different radio access technology, or signals associated with a second SIM of the apparatus 1002.

The apparatus 1002 may include additional modules that perform each of the steps of the method and messaging described in FIGS. 8 and 9. As such, each step in the aforementioned methods and flows may be performed by a module and the apparatus 1202 may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
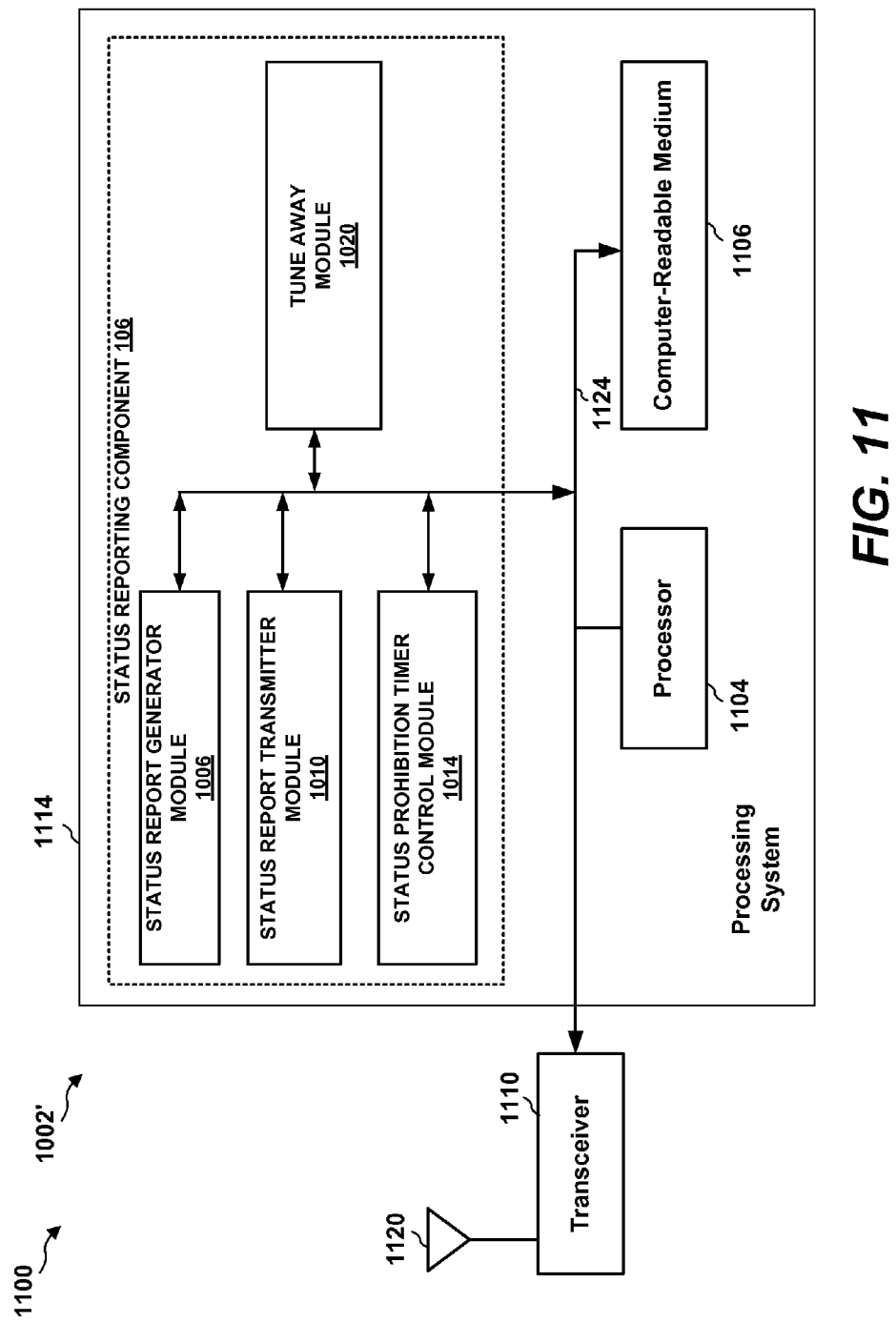
FIG. 11 is a diagram illustrating an example of a hardware implementation for an apparatus employing a processing system in which status reporting management may be implemented in accordance with the present aspects.

FIG. 11 is a diagram 1100 illustrating an example of a hardware implementation for an apparatus 1202' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, status reporting component 106 and its components (including status report generator module 1006, status report transmitter module 1010, status prohibition timer control module 1014), tune away module 1020, and the computer-readable medium 1106. The bus 1124 may also link various other circuits such as timing sources, peripherals, voltage regulators, and power management circuits, which are well known in the art, and therefore, will not be described any further.

The processing system 1114 may be coupled to a transceiver 1110, which may include receiver module 1004 and wireless transmission module 1022. The transceiver 1110 is coupled to one or more antennas 1120. The transceiver 1110 provides a means for communicating with various other apparatus over a transmission medium. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes at least the respective modules of status reporting component 106. The modules/components may be software modules running in the processor 1104, resident/stored in the computer-readable medium 1106, one or more hardware modules coupled to the processor 1104, or some combination thereof. The processing system 1114 may be a component of a UE, such as UE 115-a or such as UE 650 and may include the memory 660 and/or at least one of the TX processor 668, the RX processor 656, and the controller/processor 659, any combination of which may implement the status reporting component 106.

In one configuration, the apparatus 1202/1202' for wireless communication includes means for determining that a first status report, generated in response to a missing number of data packets, includes information associated with less than the number of missing data packets, means for transmitting the first status report, and means for prohibiting initiation of a status prohibition timer based on the determination. The aforementioned means may be one or more of the aforementioned modules of the apparatus 1002 and/or the processing system 1114 of the apparatus 1002' configured to perform the functions recited by the aforementioned means. As described supra, the processing system 1114 may include at least one of the TX processor 668, the RX processor 656, and the controller/processor 659. As such, in one configuration, the aforementioned means may be at least one of the TX processor 668, the RX processor 656, and the controller/processor 659 configured to perform the functions recited by the aforementioned means.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a UE, which can be a wired terminal or a wireless terminal. A UE can also be called a system, device, subscriber unit, subscriber station, mobile station, mobile, mobile device, remote station, remote terminal, access terminal, user terminal, terminal, communication device, user agent, or user device. A UE may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with UE or wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as LTE, CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM☐, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of wireless communications with respect to reporting a receipt status of a data packet, comprising:
   performing, by a user equipment (UE), a tune away from a communication channel for a tune away period, wherein a number of missing data packets are missed within a sequence of a plurality of data packets received at the UE on the communication channel, wherein the tune away is associated with at least one of:
   tuning away to a different air interface technology;
   tuning away to a different radio frequency; or
   tuning away to an air interface related to a second subscriber identification module (SIM) different from a first SIM associated with receiving the sequence of the plurality of data packets;
   identifying the number of missing data packets within the sequence of the plurality of data packets received at the UE;
   generating, in response to the identifying, a first status report to include information associated with fewer than all of the number of missing data packets, wherein the number of missing data packets are missed during the tune away by the UE;
   determining, by the UE, that the first status report includes information associated with fewer than all of the number of missing data packets;
   transmitting the first status report;
   disabling a status prohibition timer in response to the transmitting based on the determination; and
   transmitting a second status report including information associated with at least a portion of a remainder of the number of missing data packets not included in the first status report,
   wherein the second status report is transmitted prior to a time at which the status prohibition timer would have expired if it were started in response to the transmitting of the first status report.

2. The method of claim 1, wherein the second status report is transmitted prior to a time equal to a transmission time of the first status report plus a duration of the status prohibition timer.

3. The method of claim 1, further comprising:
   receiving an uplink grant; and
   determining a maximum data packet size based on the uplink grant, wherein the maximum data packet size is insufficient for reporting the information for all of the number of missing data packets;
   wherein the first status report includes the information associated with the number of missing data packets up to the maximum data packet size.

4. The method of claim 1, wherein the disabling of the status prohibition timer further comprises disabling at a radio link control (RLC) layer.

5. The method of claim 1, wherein the information associated with the fewer than all of the number of missing data packets includes negative-acknowledgements (NACKs) and identification of a corresponding sequence number for the fewer than all of the number of missing data packets.

6. A user equipment (UE) for wireless communications with respect to reporting a receipt status of a data packet, comprising:
   a transceiver configured to wirelessly transmit and receive data packets including a first status report;
   a memory configured to store a record of data packets received by the transceiver; and
   a processor communicatively coupled to the transceiver and the memory, the processor configured to:
   perform a tune away from a communication channel for a tune away period, wherein a number of missing data packets are missed within a sequence of a plurality of data packets received at the UE on the communication channel, wherein the tune away is associated with at least one of:
   tuning away to a different air interface technology;
   tuning away to a different radio frequency; or
   tuning away to an air interface related to a second subscriber identification module (SIM) different from a first SIM associated with receiving the sequence of the plurality of data packets;
   identify the number of missing data packets within the sequence of the plurality of data packets received at the UE;
   generate, in response to the identifying, a first status report to include information associated with fewer than all of the number of missing data packets, wherein the number of missing data packets are missed during the tune away by the UE;
   determine that the first status report includes information associated with fewer than the number of missing data packets;
   initiate transmission of the first status report via the transceiver;
   disable a status prohibition timer in response to the transmitting based on the determination; and
   initiate transmission of a second status report, via the transceiver, including information associated with at least a portion of a remainder of the number of missing data packets not included in the first status report,
   wherein the processor is configured to initiate transmission of the second status report prior to a time at which the status prohibition timer would have expired if it were started in response to the transmitting of the first status report.

7. The UE of claim 6, wherein the processor is configured to initiate transmission of the second status report prior to a time equal to a transmission time of the first status report plus a duration of the status prohibition timer.

8. The UE of claim 6, wherein the first status report includes the information associated with fewer than the number of missing data packets due to a limited uplink grant size.

9. The UE of claim 8, wherein the transceiver is configured to receive an uplink grant; and
wherein the processor is configured to determine a maximum data packet size based on the uplink grant, wherein the maximum data packet size is insufficient for reporting information for the number of missing data packets.

10. The UE of claim 6, wherein the status prohibition timer is associated with a radio link control (RLC) layer.

11. The UE of claim 6, wherein information associated with the fewer than the number of missing data packets includes negative-acknowledgements (NACKs) and identification of a corresponding sequence number for the fewer than the number of missing data packets.

12. A user equipment (UE) for wireless communications with respect to reporting a receipt status of a data packet, comprising:
means for tuning a receiver away from a communication channel for a tune away period, wherein a number of missing data packets are missed within a sequence of a plurality of data packets received at the UE on the communication channel, wherein the tune away is associated with at least one of:
tuning away to a different air interface technology;
tuning away to a different radio frequency; or
tuning away to an air interface related to a second subscriber identification module (SIM) different from a first SIM associated with receiving the sequence of the plurality of data packets;
means for identifying the number of missing data packets within the sequence of the plurality of data packets received at the UE and for generating, in response to the identifying, a first status report to include information associated with fewer than all of the number of missing data packets, wherein the number of missing data packets are missed during the tune away by the UE;
means for determining, at the UE, that the first status report includes information associated with fewer than all of the number of missing data packets;
means for transmitting the first status report; and
means for disabling a status prohibition timer in response to transmitting the first status report based on the determination,
wherein the means for transmitting is further for transmitting a second status report including information associated with at least a portion of a remainder of the number of missing data packets not included in the first status report prior to a time at which the status prohibition timer would have expired if it were started in response to the transmitting of the first status report.

13. The UE of claim 12, further comprising:
means for receiving an uplink grant; and
means for determining a maximum data packet size based on the uplink grant, wherein the maximum data packet size is insufficient for reporting the information for all of the number of missing data packets; and
wherein the means for generating the first status report is configured to generate the first status report up to the maximum data packet size.

14. A non-transitory computer-readable medium storing computer executable code for reporting a receipt status of a data packet in a wireless communication, comprising:
code for tuning a receiver of a user equipment (UE) away from a communication channel for a tune away period, wherein a number of missing data packets are missed within a sequence of a plurality of data packets received at the UE on the communication channel, wherein the tune away is associated with at least one of:
tuning away to a different air interface technology;
tuning away to a different radio frequency; or
tuning away to an air interface related to a second subscriber identification module (SIM) different from a first SIM associated with receiving the sequence of the plurality of data packets;
code for identifying the number of missing data packets within the sequence of the plurality of data packets received at the UE;
code for generating, in response to the identifying, a first status report to include information associated with fewer than all of the number of missing data packets, wherein the number of missing data packets are missed during the tune away by the UE;
code for determining, by the UE, that the first status report includes information associated with fewer than all of the number of missing data packets;
code for transmitting the first status report; and
code for disabling a status prohibition timer in response to the transmitting based on the determination; and
code for transmitting a second status report including information associated with a remainder of the number of missing data packets not included in the first status report.

15. The non-transitory computer-readable medium of claim 14, further comprising:
code for receiving an uplink grant; and
code for determining a maximum data packet size based on the uplink grant, wherein the maximum data packet size is an insufficient maximum packet size for reporting information for the number of missing data packets in a single packet, wherein the first status report includes the information associated with fewer than the number of missing data packets due to the insufficient maximum packet size.

* * * * *